United States Patent
Ball

(10) Patent No.: US 9,740,488 B2
(45) Date of Patent: Aug. 22, 2017

(54) PROCESSORS OPERABLE TO ALLOW FLEXIBLE INSTRUCTION ALIGNMENT

(71) Applicant: Altera Corporation, San Jose, CA (US)

(72) Inventor: James Loran Ball, Thornhill (CA)

(73) Assignee: Altera Corporation, San Jose, CA (US)

( * ) Notice: Subject to any disclaimer, the term of this patent is extended or adjusted under 35 U.S.C. 154(b) by 277 days.

(21) Appl. No.: 14/514,624

(22) Filed: Oct. 15, 2014

(65) Prior Publication Data

US 2015/0032995 A1 Jan. 29, 2015

Related U.S. Application Data

(63) Continuation of application No. 13/163,451, filed on Jun. 17, 2011, now Pat. No. 8,874,881, which is a continuation of application No. 10/815,478, filed on Mar. 31, 2004, now Pat. No. 8,006,071.

(51) Int. Cl.
| | |
|---|---|
| *G06F 9/30* | (2006.01) |
| *G06F 9/32* | (2006.01) |
| *G06F 9/34* | (2006.01) |
| *G06F 9/38* | (2006.01) |

(52) U.S. Cl.
CPC ........ *G06F 9/30145* (2013.01); *G06F 9/3016* (2013.01); *G06F 9/30054* (2013.01); *G06F 9/30149* (2013.01); *G06F 9/30167* (2013.01); *G06F 9/322* (2013.01); *G06F 9/34* (2013.01); *G06F 9/3816* (2013.01)

(58) Field of Classification Search
CPC ............ G06F 9/30145; G06F 9/30054; G06F 9/30149; G06F 9/3016; G06F 9/30167; G06F 9/3005; G06F 9/322; G06F 9/34; G06F 9/3816; G06F 9/324; G06F 9/35

See application file for complete search history.

(56) References Cited

U.S. PATENT DOCUMENTS

| | | |
|---|---|---|
| 5,187,791 A | 2/1993 | Baum |
| 5,420,992 A | 5/1995 | Killian et al. |

(Continued)

FOREIGN PATENT DOCUMENTS

| | | |
|---|---|---|
| CN | 1690951 A | 11/2005 |
| CN | 101387951 A | 9/2009 |

(Continued)

OTHER PUBLICATIONS

Altera Corporation, Nios II Processor Reference handbook, Chapter 20, Instruction Set Reference, San Jose, California, Dec. 2004, 20-1 thru 20-102.

(Continued)

*Primary Examiner* — Benjamin Geib
(74) *Attorney, Agent, or Firm* — L. Cho

(57) ABSTRACT

Methods and apparatus are provided for optimizing a processor core. Common processor subcircuitry is used to perform calculations for various types of instructions, including branch and non-branch instructions. Increasing the commonality of calculations across different instruction types allows branch instructions to jump to byte aligned memory address even if supported instructions are multi-byte or word aligned.

17 Claims, 10 Drawing Sheets

(56) References Cited

U.S. PATENT DOCUMENTS

| | | | |
|---|---|---|---|
| 5,590,358 A * | 12/1996 | Mizrahi-Shalom . | G06F 9/30149 712/204 |
| 6,044,455 A | 3/2000 | Hara | |
| 6,219,833 B1 | 4/2001 | Solomon et al. | |
| 6,463,520 B1 | 10/2002 | Otani | |
| 6,658,550 B2 | 12/2003 | Martin et al. | |
| 6,772,326 B2 | 8/2004 | Chauvel et al. | |
| 6,968,547 B2 | 11/2005 | Cantrill | |
| 7,178,013 B1 | 2/2007 | Batcher | |
| RE39,519 E | 3/2007 | Bak et al. | |
| 2002/0049964 A1 | 4/2002 | Takayama et al. | |
| 2002/0053711 A1 | 5/2002 | Chau et al. | |
| 2002/0073407 A1 | 6/2002 | Takayama et al. | |
| 2002/0078323 A1 | 6/2002 | Takayama et al. | |
| 2002/0108029 A1 | 8/2002 | Kondoh et al. | |
| 2003/0204705 A1 | 10/2003 | Oldfield et al. | |
| 2004/0049656 A1 | 3/2004 | Watanabe | |
| 2005/0223198 A1 | 10/2005 | Ball | |

FOREIGN PATENT DOCUMENTS

| | | |
|---|---|---|
| EP | 0 503 514 A2 | 9/1992 |
| EP | 897147 A | 2/1999 |
| EP | 0897147 A2 | 2/1999 |
| EP | 0953898 | 3/1999 |
| EP | 953898 A | 11/1999 |
| EP | 1582974 A2 | 10/2005 |

OTHER PUBLICATIONS

"U.S. Appl. No. 10/815,478, Final Office Action mailed Jan. 26, 2009".
"U.S. Appl. No. 10/815,478, Final Office Action mailed Apr. 15, 2010".
"U.S. Appl. No. 10/815,478, Final Office Action mailed Oct. 17, 2006".
"U.S. Appl. No. 10/815,478, Final Office Action mailed Dec. 12, 2007".
"U.S. Appl. No. 10/815,478, Non Final Office Action mailed Apr. 8, 2005".
"U.S. Appl. No. 10/815,478, Non Final Office Action mailed May 2, 2006".
"U.S. Appl. No. 10/815,478, Non Final Office Action mailed May 29, 2007".
"U.S. Appl. No. 10/815,478, Non Final Office Action mailed Sep. 3, 2009".
"U.S. Appl. No. 10/815,478, Non Final Office Action mailed Sep. 3, 2010".
"U.S. Appl. No. 10/815,478, Notice of Allowance mailed Mar. 18, 2011".
"U.S. Appl. No. 10/815,478, Response filed Jan. 3, 2011 to Non Final Office Action mailed Sep. 3, 2010".
"U.S. Appl. No. 10/815,478, Response filed Jan. 4, 2010 to Non Final Office Action mailed Sep. 3, 2009".
"U.S. Appl. No. 10/815,478, Response filed Mar. 5, 2007 to Final Office Action mailed Oct. 17, 2006".
"U.S. Appl. No. 10/815,478, Response filed Mar. 12, 2008 to Final Office Action mailed Dec. 12, 2007".
"U.S. Appl. No. 10/815,478, Response filed Apr. 8, 2009 to Final Office Action mailed Jan. 26, 2009".
"U.S. Appl. No. 10/815,478, Response filed May 26, 2009 to Final Office Action mailed Jan. 26, 2009".
"U.S. Appl. No. 10/815,478, Response filed Jul. 15, 2010 to Final Office Action mailed Apr. 15, 2010".
"U.S. Appl. No. 10/815,478, Response filed Aug. 2, 2006 to Non Final Office Action mailed May 2, 2006".
"U.S. Appl. No. 10/815,478, Response filed Oct. 3, 2007 to Non Final Office Action mailed May 29, 2007".
"U.S. Appl. No. 10/815,478, Response filed Dec. 15, 2006 to Final Office Action mailed Oct. 17, 2006".
"U.S. Appl. No. 11/076,307, Final Office Action mailed Apr. 30, 2010", Apr. 30, 2010, 14 pgs.
"U.S. Appl. No. 11/076,307, Final Office Action mailed Jun. 8, 2009", Jun. 8, 2009, 11 pgs.
"U.S. Appl. No. 11/076,307, Final Office Action mailed Jul. 30, 2008", Jul. 30, 2008, 27 pgs.
"U.S. Appl. No. 11/076,307, Non Final Office Action mailed Dec. 15, 2009", Dec. 15, 2009, 12 pgs.
"U.S. Appl. No. 11/076,307, Non Final Office Action mailed Dec. 18, 2008", Dec. 8, 2008, 11 pgs.
"U.S. Appl. No. 13/163,451, Final Office Action mailed Apr. 24, 2013", 8 pgs.
"U.S. Appl. No. 13/163,451, Non Final Office Action mailed Nov. 18, 2013", 8 pgs.
"U.S. Appl. No. 13/163,451, Non Final Office Action mailed Dec. 24, 2012".
"U.S. Appl. No. 13/163,451, Notice of Allowance mailed Jun. 30, 2014", 5 pgs.
"Chinese Application Serial No. 200510076224.1, Office Action mailed Nov. 2, 2007", w/ English Translation.
"Chinese Application Serial No. 200510076224.1, Response filed Mar. 17, 2008 to Office Action mailed Nov. 2, 2007", w/o English Translation, Nov. 2, 2007, 6 pgs.
"Chinese Application Serial No. 200810173125.9, Office Action mailed Jul. 13, 2010", w/ English Translation.
"Chinese Application Serial No. 200810173125.9, Office Action mailed Dec. 22, 2011", w/ English Translation.
"Chinese Application Serial No. 200810173125.9, Office Action mailed Sep. 4, 2012".
"Chinese Application Serial No. 200810173125.9, Response filed Jan. 27, 2011 to Office Action mailed Jul. 13, 2010", w/o English Translation.
"Chinese Application Serial No. 200810173125.9, Response filed Mar. 6, 2012 to Office Action mailed Dec. 22, 2011", w/ English Translation.
"Chinese Application Serial No. 200810173125.9, Response filed Nov. 14, 2012 to Office Action mailed Sep. 4, 2012".
"Data Alignment When Migrating to 64-bit Intel Architecture", Intel.
"English Translation of Claims in Chinese Publication No. 101387951".
"English Translation of Claims in Chinese Publication No. 1690951".
"European Application Serial No. 05251951.9, Office Action mailed Aug. 5, 2009".
"European Application Serial No. 05251951.9, Response filed Feb. 9, 2010 to Office Action mailed Aug. 5, 2009".
"European Patent Application No. 05251951.9, European Search Report mailed Feb. 4, 2008", Feb. 4, 2008, 2 pgs.
"Final Office Action dated Jul. 30, 2008 in U.S. Appl. No. 11/076,307", Jul. 30, 2008, 27 pgs.
"IA-32(R) Architecture Software Developer's Manual", vols. 1-2, Intel, Inc., Jun. 24, 1905 00:00:00.0.
"MIPS Instruction Reference", [Online]. Retrieved from the Internet: < www.mrc.uidaho.edu/mrc/people/jff/digital/MIPSir.html >, 12 pgs.
"Office Action date Feb. 6, 2008; U.S. Appl. No. 11/076,307".
"P6 Family of Processors Hardware Developer's Manual", Intel, Inc., Sep. 1, 1998 00:00:00.0.
"U.S. Appl. No. 11/076,307, Office Action mailed Feb. 6, 2008", Feb. 6, 2008.
"U.S. Appl. No. 11/076,307, Office Action mailed Mar. 8, 2007", Mar. 8, 2007, 20 pgs.
"U.S. Appl. No. 11/076,307, Office Action mailed Aug. 21, 2007", Aug. 21, 2007, 19 pgs.
Gwennap, Linley , "Intel Discloses New IA-64 Features, Rotating Registers Reduce Expansion; Merced Touted for Big Servers", Microdesign Resources—Microprocessor Report, Mar. 8, 1999, 4 pgs.
Hansen, Lars, "Larceny Note #6: Larceny on SPARC", [Online]. Retrieved from the Internet: < http://www.ccs.neu.edu/home/lth/larceny/notes/note6-sparc.html>, May 5, 1998, 11 pgs.

(56) References Cited

OTHER PUBLICATIONS

Hennessy, John et al., "Computer Architecture—A Quantitative Approach", Third Edition, https://books.elsevier.com, Mar. 13, 2006, 26 pgs.
Nikolova, Elena G. et al., "A Compression/Decompression Scheme for Embedded Systems Code", Electronic Systems and Control Division Research 2003, 2003, 3 pgs.
Wittig, Ralph D., "OneChip: An FPGA Processor with Reconfigurable Logic", IEEE, Jun. 18, 1905 00:00:00.0.
Wolf, Stanley, "Silicon Processing for the VLSI Era", vol. 1, Lattice Press, Jun. 8, 1905 00:00:00.0.

* cited by examiner

| Branch Instruction 201 | 203 | 205 | Immediate Field 207 |

Figure 2

| Add Integer 301 | Source Register 303 | Destination Register 305 | Immediate Field 307 |
|---|---|---|---|

Figure 3

| 401 | 403 | Immediate Field 405 | Branch Instruction 407 |

Figure 4

| Source Register 501 | Destination Register 503 | Immediate Field 505 | Add Integer Instruction 507 |
|---|---|---|---|

Figure 5

PROCESSORS OPERABLE TO ALLOW FLEXIBLE INSTRUCTION ALIGNMENT

CROSS-REFERENCE TO RELATED APPLICATIONS

This application is a continuation of U.S. patent application Ser. No. 13/163,451, filed Jun. 17, 2011 and entitled, "PROCESSORS OPERABLE TO ALLOW FLEXIBLE INSTRUCTION ALIGNMENT" which is a continuation of U.S. patent application Ser. No. 10/815,478, filed Mar. 31, 2004, now U.S. Pat. No. 8,006,071, and entitled "PROCESSORS OPERABLE TO ALLOW FLEXIBLE INSTRUCTION ALIGNMENT", the entirety of which are incorporated by reference for all purposes.

FIELD OF THE INVENTION

The present invention relates to processors. In one example, the present invention relates to methods and apparatus for optimizing a processor and allowing flexible instruction alignment.

BACKGROUND

Conventional processors are configured to support a variety of instructions. In many instances, processor circuitry is configured to perform particular instructions. Instructions are often handled sequentially using specially configured subcircuitry. In one instance, a particular type of instruction, the branch instruction, allows the flow of execution of a program to change by performing a jump to a non-sequential instruction at a branch target address. Specialized circuitry is often provided to calculate addresses that are the target of the jump operations for branch instructions.

However, mechanisms for efficiently performing calculations for different types of instructions are limited. In one example, specialized subcircuitry is configured to calculate multi-byte branch aligned target addresses. However, the specialized subcircuitry is often not reused for other types of instructions.

Mechanisms for efficiently optimizing processor cores are limited. It is therefore desirable to provide improved methods and apparatus for optimizing implementation of processors and processor circuitry. In some instances, alignment restrictions can be relaxed to allow further processor optimization.

SUMMARY

Methods and apparatus are provided for optimizing a processor core. Common processor subcircuitry is used to perform calculations for various types of instructions, including branch and non-branch instructions. Increasing the commonality of calculations across different instruction types allows branch instructions to jump to byte aligned memory address even if supported instructions are multi-byte or word aligned.

In one embodiment, a processor is provided. The processor includes a multiple registers and circuitry. The circuitry is configured to process instructions associated with an instruction set including a branch and non-branch instructions. The instructions each having a multi-byte length. The instructions are accessible at multi-byte aligned addresses. Multi-byte aligned branch instructions are operable to access the instructions at byte aligned addresses.

In another embodiment, a processor is provided. The processor includes multiple registers and circuitry. The circuitry is configured to process branch and non-branch instructions associated with an instruction set. The branch instructions and non-branch instructions include an immediate field. Common subcircuitry is used to process the immediate field associated with one or more branch instructions and one or more non-branch instructions.

In another embodiment, a method for performing an instruction is provided. A branch instruction associated with an address is decoded. The branch instruction has an associated opcode and an immediate value. A branch target address is calculated using the immediate value. The branch target address is determined by using common subcircuitry. The common subcircuitry is operable to calculate a byte-aligned address. The common subcircuitry is also configured to perform nonbranch operations. A jump is performed to the branch target address. The branch target address is multi-byte aligned.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate various embodiments of the present invention.

FIG. 2 is a diagrammatic representation showing a non-branch instruction.

FIG. 3 is a diagrammatic representation showing a branch instruction.

FIG. 4 is a diagrammatic representation showing a non-branch instruction performed using common subcircuitry.

FIG. 5 is a diagrammatic representation showing a branch instruction performed using common subcircuitry.

DETAILED DESCRIPTION

Figure 1:
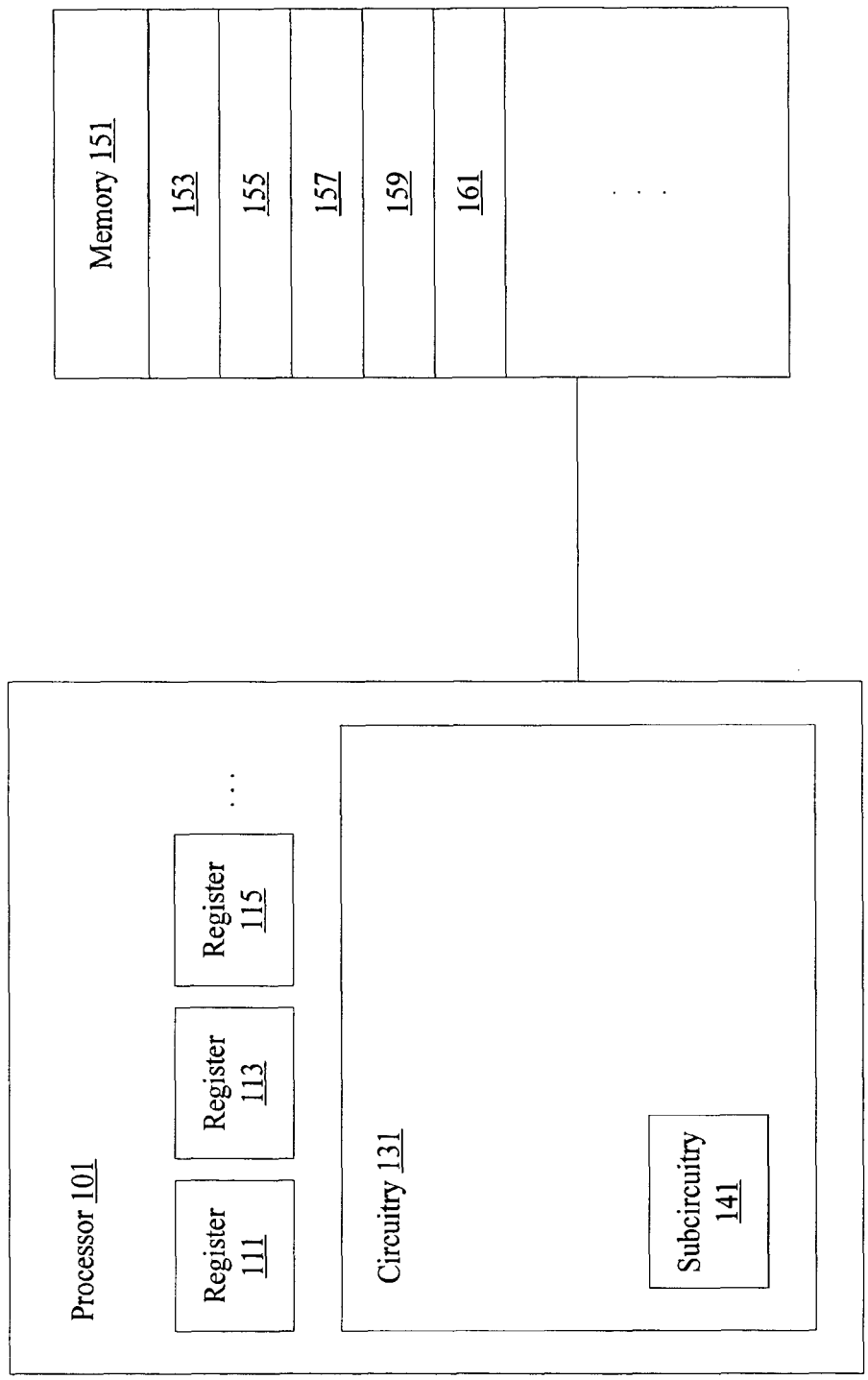
FIG. 1 is a diagrammatic representation showing a processor.

Reference will now be made in detail to various embodiments of the invention including the best modes contemplated by the inventors for carrying out the invention. Examples of these embodiments are illustrated in the accompanying drawings. While the invention is described in conjunction with these embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processors and memory.

However, it should be noted that the techniques of the present invention can be applied to a variety of types of devices. In the following description, numerous details are set forth in order to provide a thorough understanding of the present invention. The present invention may be practiced without some or all of these details. In other instances, well known process operations have not been described in detail in order not to unnecessarily obscure the present invention. Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Conventional processors are configured to support a variety of instructions. Some processors support a general-purpose instruction set such as a reduced instruction set computing (RISC) instruction set, a complex instruction set computing (CISC), or a very long instruction word (VLIW), instruction set. Other more specialized processors such as Digital Signal Processing (DSP) processors or video accelerators may support more specialized instruction sets. Typical processors will perform operations based on the type of instruction and the associated parameters received. For example, a processor can perform a sequence of add instructions followed by memory access instructions such as load and store.

Instruction sets may include a variety of instructions including arithmetic instructions such as add unsigned or subtract unsigned, logical instructions such logical AND and OR, data transfer instructions such as load word or store word, branch instructions such as branch on equal or branch on not equal, and jump instructions. Some processor architectures allow instructions in an instruction set to vary in length. For example, some instructions may be 16-bits in length instructions while other instructions are 32-bits in length. However, other architectures use instructions that have a fixed length. Using an instruction set including only fixed length instructions greatly simplifies implementation of an instruction set.

In many instances, simplicity leads to efficiency. Because instructions are fixed length, the instructions can be aligned with particular memory addresses. For example, instruction memory is addressed in units of bytes. Any instruction having a start address at any byte address is referred to herein as a byte aligned instruction. Any instruction that has a start address that is an integer multiple of a byte address greater than one is referred to herein as a multiple byte aligned instruction. For example, a case of a multiple byte aligned instruction is a word aligned instruction. The word aligned instruction has a start address that is aligned at intervals of four bytes.

Consequently, any word aligned instruction in instruction memory will start at an address of four bytes, eight bytes, 12 bytes, 16 bytes, etc. Because instructions are word aligned, some instructions such as branch instructions are only able to jump to particular word aligned addresses. The branch instructions such as branch on equal or branch on not equal instructions allow a change in the flow of execution of a program by jumping to a nonsequential instruction at a branch target address. In some examples, the branch target address is computed as a function of an offset embedded in the branch instruction and the address of the branch instruction. In other examples, a branch instruction may be given an absolute address. Conventional processors use specialized subcircuitry to calculate a branch target address. Specialized subcircuitry determines the branch target address using the assumption that the branch target address is multi-byte aligned or word aligned.

The techniques and mechanisms of the present invention recognize that using a specialized subcircuit to determine a multi-byte aligned or a word aligned branch target address is inefficient. The techniques and mechanisms of the present invention minimize hardware costs and maximize performance by increasing the commonality of calculations across different instruction types. For example, subcircuitry used to perform a load or store instruction is also used to perform a branch instruction. By using common subcircuitry, hardware costs are reduced because the same subcircuitry can be reused across different instruction types. No dedicated subcircuit is required for noncommon calculations. By decreasing the amount of circuitry in a processor, increasing processor frequency and performance is typically allowed.

In one example, the techniques of the present invention allow the efficient calculation of a branch target. In typical instances, calculating a branch target involves determining the sign extended value of an immediate field associated with a branch instruction. A processor already has other non-branch instructions that perform calculations using the sign extended value of the same immediate field. However, multi-byte alignment issues have conventionally prevented the use of the same subcircuitry to perform both types of instructions. By choosing the branch offset to be in bytes, the same subcircuitry used to perform the sign extension of the immediate field for non-branch instructions can be reused for branch instructions.

Allowing the reuse of subcircuitry for different instruction types provides other benefits as well. By reusing subcircuitry, support for changes in the instruction set is provided. New instructions can be added and flexibly handled using the techniques and mechanisms of the present invention. For example, when smaller instructions such as 16-bit instructions are introduced into a 32-bit instruction set, the alignment restrictions are typically reduced to match the size of the smallest instruction. Using the techniques and mechanisms of the present invention, the branch instruction will be able to jump to these instructions even if the new instructions are not multi-byte aligned. For example, if instructions in instruction set were previously word aligned, the new instructions can be byte aligned or half word aligned and the branch instruction will still be able to jump to the appropriate memory location.

Without using the techniques of the present invention, existing branch instructions will have to be changed to break compatibility or new branch instructions will have to be added to support the smaller instruction alignment restrictions. By adding a whole set of new branch instructions, additional subcircuitry will have to be introduced, potentially increasing hardware costs. Some conventional processors use multi-byte aligned instructions. Many of the conventional processors are being configured to support smaller instructions. In many cases, new branch instructions are being written simply to handle these particular smaller instructions. The conventional processors are consequently left with different groups of branch instructions. One group of branch instructions handles 16-bit aligned instructions. Another group of similar branch instructions handles 8-bit aligned instructions. These redundant groups of branch instructions in conventional processors are highly inefficient.

FIG. 1 is a diagrammatic representation showing a processor configured to handle an instruction set. A processor 101 includes a register bank with register 111, register 113, and register 115. Processor 101 also includes circuitry 131 for handling various instructions. Circuitry 131 includes subcircuitry 141. Any portion of processor circuitry used to perform instructions in an instruction set is referred to herein as subcircuitry. Processor 101 is connected to memory 151 with memory lines 153-161. It should be noted that a processor 101 may also have other configurations and include other components not shown such as an instruction cache, data cache, and a memory controller. In typical examples, a processor reads instructions sequentially from memory and performs these instructions. The instructions may involve operations on data also loaded from memory and placed in registers for even more efficient access. Performing operations such as arithmetic operations involves using particular hardware within the processor 101. A branch instruction may involve using another piece of hardware within processor 101.

In an overly simplistic example, each instruction is handled by a different subcircuit within the processor 101. For example, a logical AND operation may be performed using subcircuitry 141, register 111, and a particular value provided in an instruction. A parameter used in an instruction to provide information for performing a particular operation is referred to herein as an immediate value. In some instances, immediate values are obtained from memory in a prior instruction.

According to various embodiments of the present invention, branch instructions allow the processing of a sequence of operations to move to a different multi-byte aligned memory location. In one example, instructions are word aligned. The branch instruction allows a branch to a particular word aligned address. However, branches to other addresses are not allowed. In general, it will be appreciated that restricting alignment to multi-byte or word aligned memory locations allows access to a greater range of memory addresses. More specifically, a limited number of bits are available to store the offset associated with a branch. In one simplified example, three bits or eight different values of offset are provided. If no multi-byte alignment is used, the branch target address is restricted to a three bit range of eight bytes in the memory space. However, if word alignment is used, the offset is multiplied by 4. The branch target address range is now expanded to a five bit range or thirty-two bytes in the memory space. In this example, the target address still can only be in 8 memory locations, however the eight locations are spread over a range of thirty-two bytes instead of being limited to a range of eight bytes.

Consequently, many processor architectures use multi-byte alignment to expand a branch target address range. Any range of addresses that includes a potential target address for a branch instruction is referred to as a branch target address range. In many processors and ASICs, adding logic and subcircuitry to handle unique instructions is less-expensive than adding logic in a programmable chip to handle unique instructions. Logic in many programmable devices is at a premium and consequently the techniques of the present invention recognize that it is particularly advantageous to reuse subcircuitry for handling different types of instructions even if the branch target address range is decreased.

FIG. 2 is a diagrammatic representation showing a conventional instruction. According to various embodiments, the instruction includes an opcode specifying a branch instruction 201, empty fields 203 and 205, and an immediate value 207. According to various embodiments, the opcode for the branch instruction 201 is six bits, empty fields 203 and 205 are each five bits, and the immediate field 207 is 16 bits for a total of 32 bits in the instruction. According to various embodiments, instructions are word aligned. When a processor reaches a particular branch instruction, it determines using the offset where the branch target memory address should be found. In one example, the branch target address is computed by multiplying the branch offset by 4, thereby ensuring word alignment and increasing the branch target address range. The result is then signed extended to the number of bits in the instruction address. The sign extended value is then added to the branch instruction address or the program counter. In one example, the calculation is as follows:

branch_target=program_counter+sign_extend (immediate_field*4)

The multiplication of the immediate value by four is performed because the unit of the branch offset is words and the units of the program counter and branch target are bytes.

FIG. 3 is a diagrammatic representation showing a conventional arithmetic instruction. According to various embodiments, an instruction includes an add integer operation code (opcode) 301, the source register 303, the destination register 305, and an immediate field value 307. According to various embodiments, the opcode for the add integer instruction 301 is six bits, register fields 303 and 305 are each five bits, and the immediate field 307 is 16 bits for total of 32 bits in the instruction. In one example, the add integer instruction takes the value of the register identified in the source register field 303, adds it to the sign extended value of the immediate field 307, and writes the result to the register specified by the destination register field 305. In one example, the immediate field is sign extended from 16 bits to 32 bits, or the length of an instruction. According to various embodiments, the add integer instruction is calculated as follows:

dest_register_value=source_register_value+sign_extend (immediate_field)

Although both the branch instruction and the add integer instruction perform sign extension operations on the immediate field value, the branch instruction multiplies the immediate field value by four before performing the sign extension. The multiplication is performed to allow for word alignment and an expanded target branch address range. However, by requiring a multiplication of four before performing the sign extension, different subcircuitry route is required to perform the operation. In many instances, one subcircuit is configured to sign extend an immediate field and another subcircuit is configured to perform a sign extend of an immediate field multiplied by four. In some examples, multiplication by four is performed by using additional multiplexers and shifters on a base sign extended subcircuit. However, having additional hardware or additional subcircuits is expensive, particularly for programmable chips. Consequently, and the techniques and mechanisms of the present invention allow the reuse of subcircuitry for both types of instructions.

Techniques and mechanisms of the present invention allow the units of branch instructions to be in bytes even though many of the instructions are multiple bytes in size and required to be aligned on multi-byte addresses.

FIG. 4 is a diagrammatic representation showing a branch instruction that allows byte aligned addresses. Fields 401 and 403 remain empty. The operation code for the branch instruction is included in field 407. The branch offset is included in the immediate field 405. However, unlike a conventional branch instruction, the immediate field value is maintained in units of bytes instead of units of words. For example, a conventional instruction would indicate that an offset is thirty-two words in size. The value of 32 would be held in a conventional branch instruction immediate field. Multiplication by four would indicate that the offset is 128 bytes in size. According to various embodiments, 128 is held in the immediate field 405 instead of the value 32. Because the value of 128 is held, no multiplication or other conversion is needed. The target address is calculated by sign extending the offset to the number of bits in the instruction address and adding it to the branch instruction address or program counter. According to various embodiments, the sign extended offset is added to a variation on the program counter value such as the program counter plus four. In one embodiment, the calculation is as follows:

$$branch\_target = program\_counter + sign\_extend(immediate\_field)$$

No multiplication by four is required because the units of the branch are bytes and the units of the program counter value and branch target are bytes.

FIG. 5 is a diagrammatic representation showing a typical non-branch instruction. The non-branch instruction includes a source register field 501, the destination register field 503, and immediate value field 505, and an opcode such as an add integer instruction 507. According to various embodiments, the add integer instruction takes the value of the register specified by the source register field 501, adds it to the signed extended value of the immediate field 505, and writes the result to the register specified by the destination register field 503. In one embodiment the calculation is as follows:

$$dest\_register\_value = source\_register\_value + sign\_extend(immediate\_field)$$

Because both branch and non-branch operations perform a sign extended operation on the immediate field value, the same subcircuit can be reused for both types of operations. Using the same subcircuitry allows efficient use of hardware resources and reduced processor core sizes.

Figure 6:
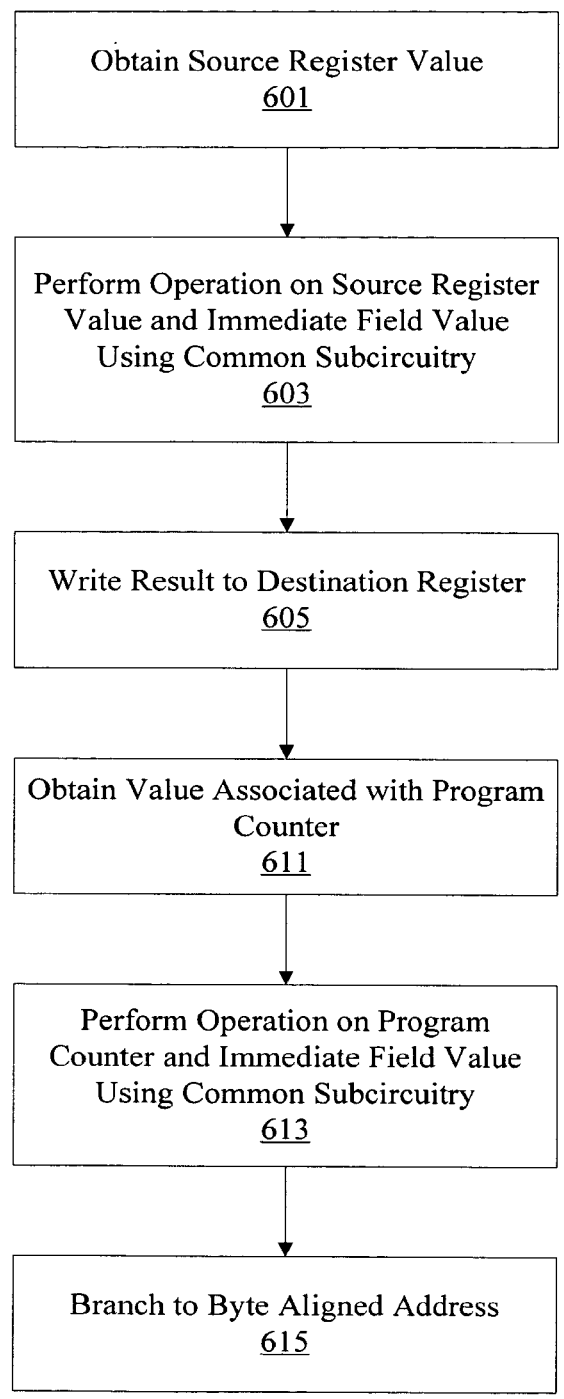
FIG. 6 is a flow process diagram showing instruction processing.

FIG. 6 is a flow process diagram showing a technique for using common subcircuitry for handling both branch and non-branch operations. At 601, a source register value is obtained. At 603, an operation on the source register value and the immediate field value is performed using common subcircuitry. In one example, the common subcircuitry used is circuitry for performing a sign extend operation. At 605, the result is written to the destination register. At 611, the value associated with a program counter is obtained. At 613, and operation is performed on the program counter and the immediate field value using the same subcircuitry noted in 603. At 615, a branch is performed on a byte aligned addresses. It should be noted that although FIG. 6 is used to describe one example of implication of a non-branch and a branch instruction, many other examples and configurations are possible. Furthermore, performing instructions may involve a variety of other operations such as loads and stores but are not described here for clarity.

Although the techniques and mechanisms of the present invention or applicable to a variety of different processors including general purpose processors, video accelerators, cryptography accelerators, digital signal processors, microcontrollers, etc., the techniques and mechanisms of the present invention or particularly applicable to soft core processors on programmable chips and programmable chip systems. Logic is often at a premium on programmable chips, so the reduction in core sizes is often particularly beneficial.

Figure 7:
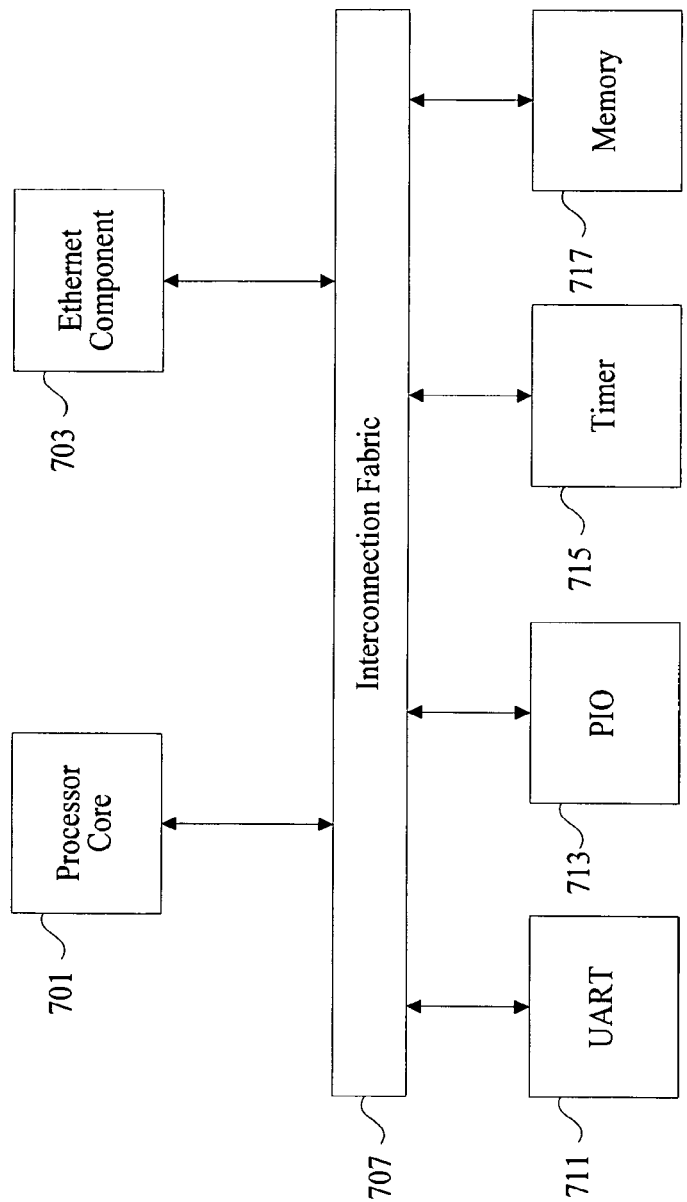
FIG. 7 is a diagrammatic representation showing a programmable chip.

FIG. 7 is a diagrammatic representation showing one example of a system on a programmable chip that can be used to implement the techniques of the present invention. The system includes a processor core, a hardware accelerator, peripheral devices, and peripheral interfaces. The processor core size can be optimized by reusing subcircuitry to perform both branch and non-branch operations. Peripheral devices and peripheral interfaces are herein referred to as components. The system on a programmable chip includes processor core 701 and an Ethernet component 703 as well as peripheral components UART 711, PIO 713, timer 715, and data memory 717. In some examples, the Ethernet component 103 is instead a Digital Signal Processing (DSP) core, a cryptography accelerator, or a video processor. It should be noted that the system can include both on-chip memory 717 and off-chip memory. In one example, the data memory 717 can support variable latency or fixed latency access. The components are interconnected using an interconnection fabric 707. Any mechanism or logic for connecting components in a system is referred to herein as an interconnection fabric. In one example, the interconnection fabric is a bus. In another example, the interconnection fabric is a secondary side arbitration fabric.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

The techniques and mechanisms of the present invention allow the implementation of a system on a programmable chip from a high-level language program. In one example, variable latency and fixed latency can be supported on a system using a conventional bus architecture.

A system bus typically has a set width (e.g. 64 bits, 128 bits) and allows only one primary component to actively use the bus at any one time. In conventional systems, only one primary component can access any one of the given secondary components at any given time. Multiple primary components accessing secondary components in a manner that would cause data bit collisions if performed on the same data lines is referred to herein as accessing secondary components at the same time.

In one example, an Ethernet component is accessing a secondary PIO. While the Ethernet component is accessing the secondary PIO, a processor cannot access an SDRAM through a peripheral interface even if both the primary streaming output device and the peripheral interface are available.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip or a programmable device. Instead of implementing complicated bus sharing schemes using mechanisms such as splitting, the bus itself can be eliminated to improve system performance.

According to some embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed. Furthermore, by not using a bus, interconnection flexibility is enhanced. For example, an Ethernet component can be allocated a variety of ports for directly accessing a memory and the only resource in contention would be the memory.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. The techniques of the present invention recognize that Ethernet component support for high-level language programs can be more efficiently and effectively provided in a system by using secondary side arbitration.

Figure 8:
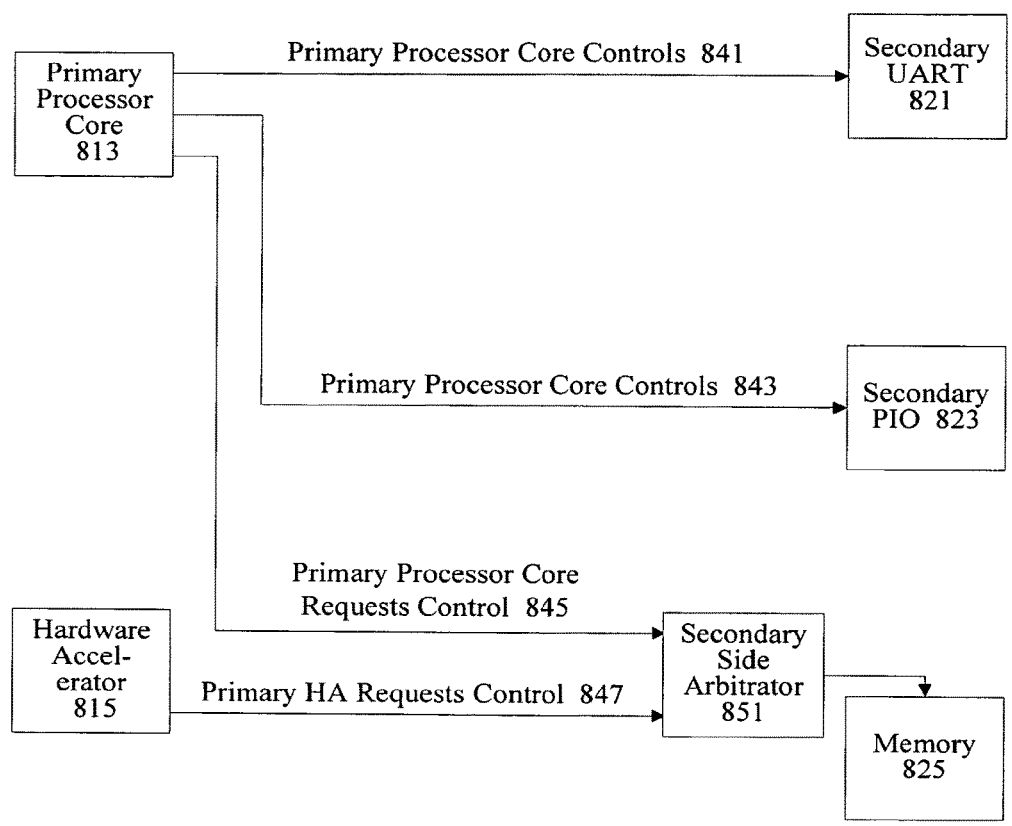
FIG. 8 is a diagrammatic representation showing an interconnection fabric.

FIG. 8 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments, a secondary component such as memory 825 is associated with a secondary side arbitrator 851. However, secondary components UART 821 and PIO 823 are not associated with any arbitrator. In one example, secondary component UART 821 and secondary PIO 823 can only be accessed by primary CPU 813 and not by primary hardware accelerator 815. A secondary memory component 825, however, can be accessed by both primary CPU 813 and primary hardware accelerator 815.

According to various embodiments, a secondary side arbitrator 851 allows a first secondary component in a system to be accessed by a first primary component at the same time a second secondary component in the system is accessed by a second primary component. For example, memory 825 can be accessed by primary hardware accelerator 815 through secondary side arbitrator 851 at the same time, secondary UART 821 is accessed by primary CPU 813.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

Figure 9:
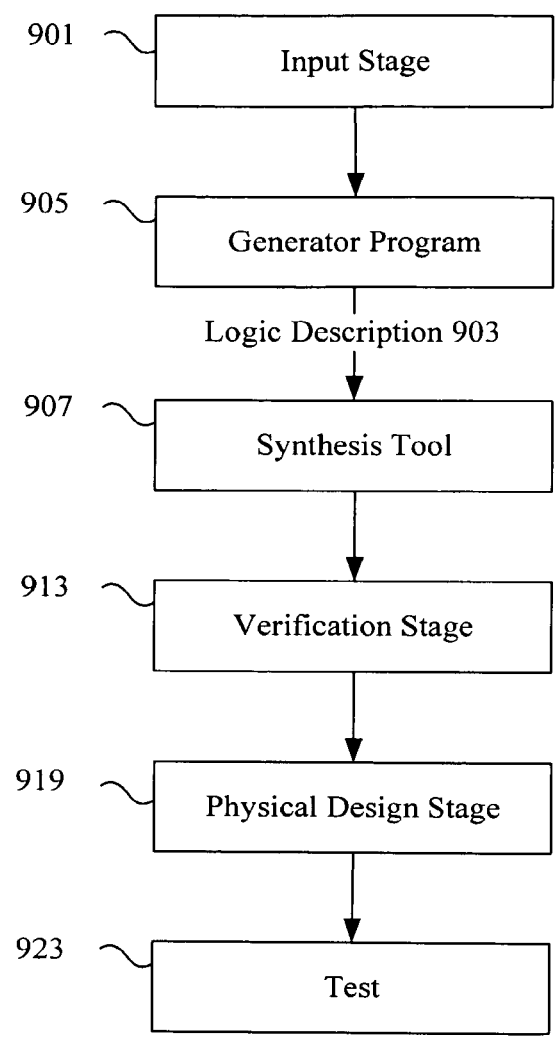
FIG. 9 is a diagrammatic representation showing a technique for implementing the programmable chip.

FIG. 9 is a diagrammatic representation showing implementation of a system on a programmable chip. An input stage 901 receives selection information typically from a user for logic such as a processor core as well as other components such as a streaming output device to be implemented on an electronic device. In one example, the input received is in the form of a high-level language program. A generator program 905 creates a logic description and provides the logic description along with other customized logic to any of a variety of synthesis tools, place and route programs, and logic configuration tools to allow a logic description to be implemented on an electronic device.

In one example, an input stage 901 often allows selection and parameterization of components to be used on an electronic device. The input stage 901 also allows configuration of variable or fixed latency support. In some examples, components provided to an input stage include intellectual property functions, megafunctions, and intellectual property cores. The input stage 901 may be a graphical user interface using wizards for allowing efficient or convenient entry of information. The input stage may also be a text interface or a program reading a data file such as a spreadsheet, database table, or schematic to acquire selection information. The input stage 901 produces an output containing information about the various modules selected.

In typical implementations, the generator program 905 can identify the selections and generate a logic description with information for implementing the various modules. The generator program 905 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 905 identifies pointers and provides ports for each pointer. One tool with generator program capabilities is System on a Programmable Chip (SOPC) Builder available from Altera Corporation of San Jose, Calif. The generator program 905 also provides information to a synthesis tool 907 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain code readable only by a synthesis tool. The HDL files at this point may also be passed to a simulation tool.

As will be appreciated by one of skill in the art, the input stage 901, generator program 905, and synthesis tool 907 can be separate programs. The interface between the separate programs can be a database file, a log, or simply messages transmitted between the programs. For example, instead of writing a file to storage, the input stage 901 can send messages directly to the generator program 905 to allow the generator program to create a logic description. Similarly, the generator program can provide information directly to the synthesis tool instead of writing HDL files.

Similarly, input stage 901, generator program 905, and synthesis tool 907 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 907.

A synthesis tool 907 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 913 typically follows the synthesis stage 907. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 913, the synthesized netlist file can be provided to physical design tools 919 including place and route and configuration tools. A place and route tool typically locates logic cells on logic elements of a target hardware device and connects wires between the inputs and outputs of the various logic elements in accordance with logic required to implement an electronic design. The device can also be physically tested at 923.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 901, generator program 905, the synthesis tool 907, the verification tools 913, and physical design tools 919 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 10:
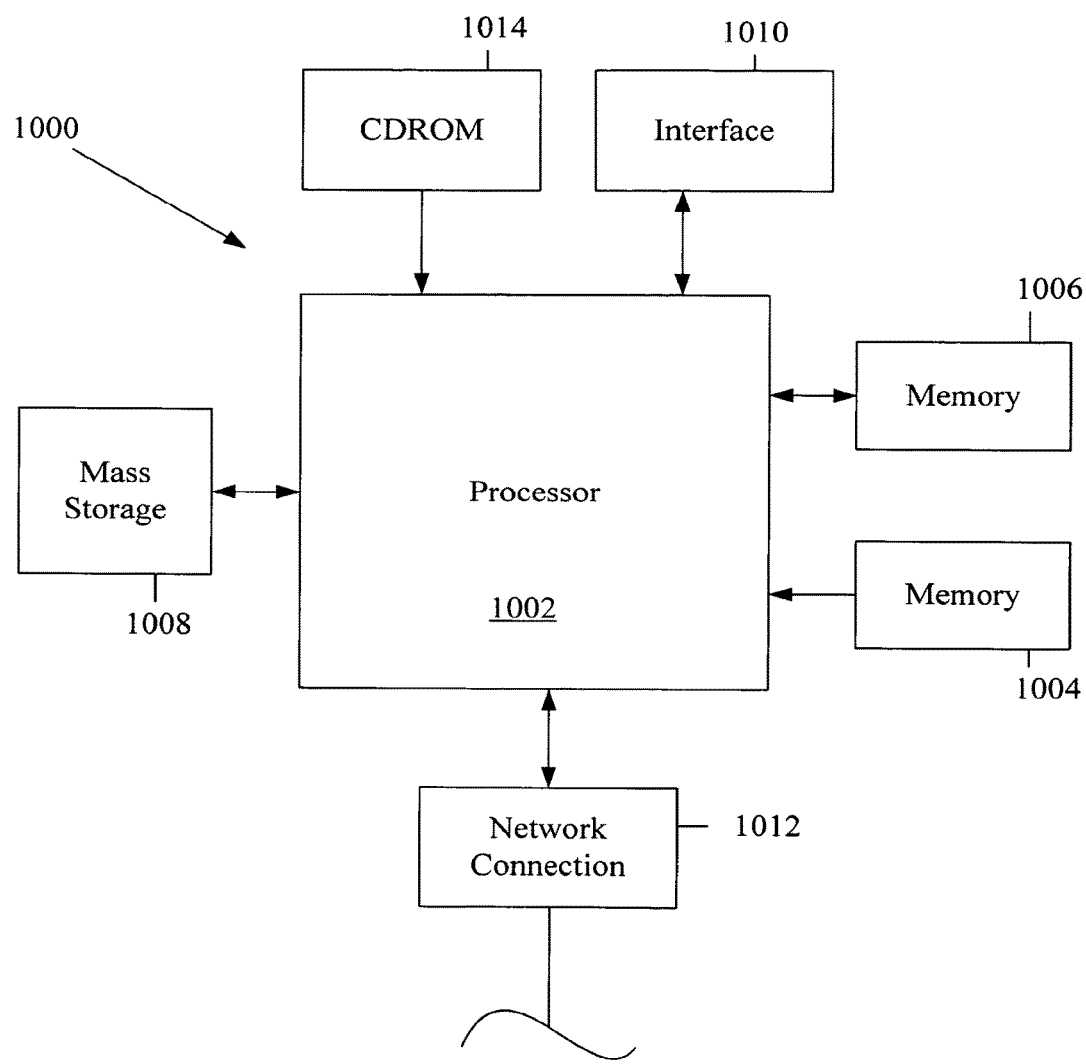
FIG. 10 is a diagrammatic representation depicting a computer system.

FIG. 10 illustrates a typical computer system that can be used to implement a programmable chip having shared I/O lines. The computer system 1000 includes any number of processors 1002 (also referred to as central processing units, or CPUs) that are coupled to devices including memory 1006 (typically a random access memory, or "RAM"), memory 1004 (typically a read only memory, or "ROM"). The processors 1002 can be configured to generate a test sequences for any designated processor. As is well known in the art, memory 1004 acts to transfer data and instructions uni-directionally to the CPU and memory 1006 is used typically to transfer data and instructions in a bi-directional manner.

Both of these memory devices may include any suitable type of the computer-readable media described above. A mass storage device 1008 is also coupled bi-directionally to CPU 1002 and provides additional data storage capacity and may include any of the computer-readable media described above. The mass storage device 1008 may be used to store programs, data and the like and is typically a secondary storage medium such as a hard disk that is slower than memory. The mass storage device 1008 can be used to hold a library or database of prepackaged logic or intellectual property functions, as well as information on generating particular configurations. It will be appreciated that the information retained within the mass storage device 1008, may, in appropriate cases, be incorporated in standard fashion as part of memory 1006 as virtual memory. A mass storage device such as a CD-ROM 1014 may also pass data uni-directionally to the CPU.

CPU 1002 is also coupled to an interface 1010 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1002 optionally may be coupled to a computer or telecommunications network using a network connection as shown generally at 1012. With such a network connection, it is contemplated that the CPU might receive information from the network, or might output information to the network in the course of performing the above-described method steps. It should be noted that the system 1000 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 1008 or 1014 and executed on CPU 1008 in conjunction with primary memory 1006.

Although many of the components and processes are described above in the singular for convenience, it will be appreciated by one of skill in the art that multiple components and repeated processes can also be used to practice the techniques of the present invention.

While the invention has been particularly shown and described with reference to embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. It is therefore intended that the invention be interpreted to include all variations and equivalents that fall within the true spirit and scope of the present invention.

What is claimed is:

1. A method comprising:
performing by a first subcircuitry a multi-byte non-branch instruction; and
performing by the first subcircuitry a multi-byte branch instruction, the branch instruction having a different multi-byte alignment from the non-branch instruction, wherein the multi-byte branch instruction is used to bypass access to a first byte of a mult-byte target instruction associated with the target address to access a subsequent byte of the multi-byte target instruction, wherein the multi-byte branch instruction is performed without first performing a multiplication with an immediate field associated with the multi-byte branch instruction, wherein the first subcircuitry is used to calculate a target address even if the target address contains a byte aligned instruction or a multi-byte aligned instruction.

2. The method of claim 1, wherein the units of the immediate field of the multi-byte branch instruction are bytes.

3. The method of claim 1, wherein the multi-byte non-branch instruction and the multi-byte branch instruction are accessed at word aligned addresses.

4. The method of claim 1, wherein branch instructions comprise branch and conditional branch instructions.

5. The method of claim 1, wherein non-branch instructions comprise load and store instructions.

6. The method of claim 1, wherein units of the target address and the program counter value are bytes.

7. The method of claim 1, wherein the first subcircuitry is included in a processor core.

8. The method of claim 7, wherein the processor core is a processor core on a programmable chip.

9. The method of claim 7, wherein the processor core is a processor core on an application specific integrated circuitry (ASIC).

10. A processor core comprising:
a program counter operable to maintain a program counter value; and
a common subcircuitry arranged to:
perform a multi-byte non-branch instruction, and
perform a multi-byte branch instruction, the branch instruction having a different multi-byte alignment from the non-branch instruction, wherein the multi-byte branch instruction is used to bypass access to a first byte of a multi-byte target instruction associated with the target address to access a subsequent byte of the multi-byte target instruction, wherein the multi-byte branch instruction is performed without first performing a multiplication with an immediate field associated with the multi-byte branch instruction, wherein the common subcircuitry is operable to calculate a target address even if the target address contains a byte aligned instruction or a multi-byte aligned instruction.

11. The processor core of claim 10, herein the units of the immediate field of the multi-byte branch instruction are bytes.

12. The processor core of claim 10, wherein the multi-byte non-branch instruction and the multi-byte branch instruction are accessed at word aligned addresses.

13. The processor core of claim 10, wherein branch instructions comprise branch and conditional branch instructions.

14. The processor core of claim 10, wherein non-branch instructions comprise load and store instructions.

15. The processor core of claim 10, wherein units of the second sign extended value of the second immediate field, the target address, and the value of the program counter are bytes.

16. The processor core of claim 10, wherein common subcircuitry is included in a processor core.

17. A system comprising:
a processor having a program counter and a common subcircuitry arranged to:
perform a multi-byte non-branch instruction, and
perform a multi-byte branch instruction, the branch instruction having a different multi-byte alignment from the non-branch instruction, wherein the multi-byte branch instruction is used to bypass access to a first byte of a multi-byte target instruction associated with the target address to access a subsequent byte of the multi-byte target instruction, wherein the multi-byte branch instruction is performed without first performing a multiplication with an immediate field associated with the multi-byte branch instruction, wherein the common subcircuitry is operable to calculate a target address even if the target address contains a byte aligned instruction or a multi-byte aligned instruction.

* * * * *